(12) United States Patent
Richards

(10) Patent No.: US 6,663,185 B1
(45) Date of Patent: Dec. 16, 2003

(54) TIPPING TRAILERS

(75) Inventor: Rhys William Richards, New South Wales (AU)

(73) Assignee: Patents4Us Pty Ltd, New South Wales (AU)

(*) Notice: Subject to any disclaimer, the term of this patent is extended or adjusted under 35 U.S.C. 154(b) by 0 days.

(21) Appl. No.: 09/959,886

(22) PCT Filed: May 12, 2000

(86) PCT No.: PCT/AU00/00453

§ 371 (c)(1),
(2), (4) Date: Nov. 13, 2001

(87) PCT Pub. No.: WO00/69675

PCT Pub. Date: Nov. 23, 2000

(30) Foreign Application Priority Data

May 12, 1999 (AT) .............................................. PQ0322

(51) Int. Cl.[7] .................................................. B60P 1/18
(52) U.S. Cl. ................. 298/175; 298/17.5; 298/22 AE; 298/22 C
(58) Field of Search ............................ 298/175, 175 G, 298/17.5, 22 AE, 17 B, 22 C; 414/484, 494

(56) References Cited

U.S. PATENT DOCUMENTS

| 2,027,098 A | * | 1/1936 | Helms |
| 2,861,837 A | * | 11/1958 | Morre |
| 3,055,710 A | | 9/1962 | Black |
| 3,336,080 A | * | 8/1967 | Heck et al. |
| 3,512,836 A | * | 5/1970 | Polich, Jr. |
| 4,216,996 A | | 8/1980 | Pitts ............................ 298/175 |
| 4,763,953 A | * | 8/1988 | Chalin ....................... 298/17.5 |
| 4,948,155 A | | 8/1990 | Smith et al. |
| 4,954,039 A | * | 9/1990 | Johnston et al. |
| 5,184,872 A | * | 2/1993 | Larochelle et al. ..... 298/22 AE |
| 5,758,927 A | * | 6/1998 | Koester .................. 298/22 AE |
| 5,782,538 A | | 7/1998 | Backs ....................... 298/17.5 |
| 5,957,538 A | | 9/1999 | Sullivan .................... 298/17.5 |

FOREIGN PATENT DOCUMENTS

EP 0 042 729 12/1981

* cited by examiner

Primary Examiner—Stephen T. Gordon
(74) Attorney, Agent, or Firm—Yount & Thompson

(57) ABSTRACT

A tipping trailer having forward and rear ends and a longitudinal axis and including a trailer bed (14), longitudinally spaced wheel assemblies (16,17) for supporting the rear end of the trailer bed (14), pivotally mounted arm element (19) coupling the trailer bed (14) to the longitudinally spaced wheel assemblies (16,17), the arm element (19) has a rearward pivotal connection (21) and a forward pivotal connection (20) such that as the trailer bed (14) is tipped the longitudinally spaced wheel assemblies (16,17) remain in ground contact during tipping of the trailer bed (14) with the load distributed evenly across the longitudinally spaced wheel assemblies (16,17).

27 Claims, 3 Drawing Sheets

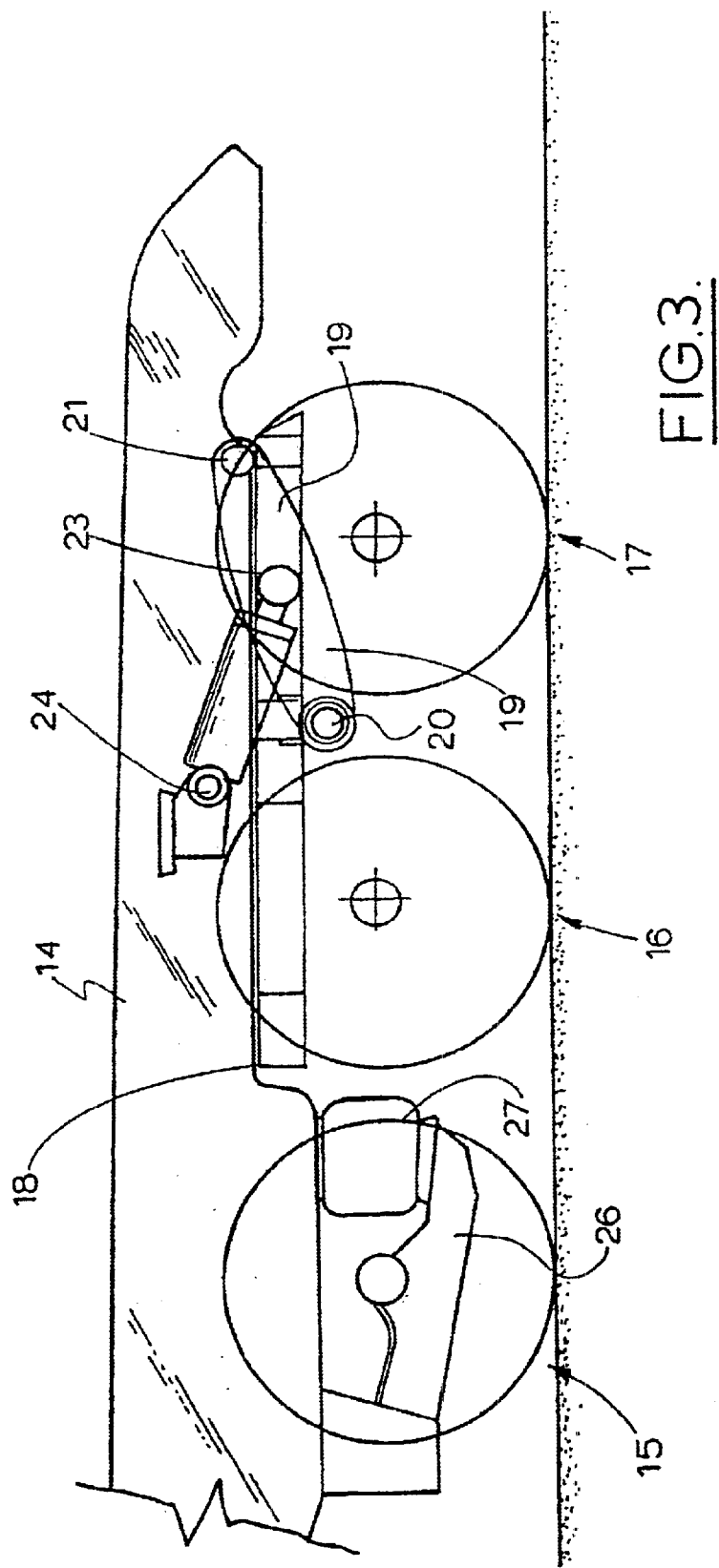

TIPPING TRAILERS

TECHNICAL FIELD OF THE INVENTION

THIS INVENTION relates to tipping trailers and in a particular aspect to an improved method of means for stabilising such trailers particularly during the tipping thereof.

BACKGROUND TO THE INVENTION

Tipping trailers have a number of different applications. In one application, tipping trailers are designed for carrying containers and the trailers are tipped to facilitate the containers being rolled onto or from a trailer. Tipping trailers however also have many other applications. The tipping trailers that are currently available are of a number of different designs including trailers having wheels mounted in a fixed position at the rear of the trailer bed. A disadvantage of tipping trailers is that they are relatively unstable when in a tipped position as the full load is taken by the axle of the rear wheel assembly only.

Trailers with increased load carrying capacity are fitted with three or more sets of longitudinally spaced wheel assemblies. Whilst this increases the load carrying capacity of the trailer in transit, the same difficulties referred to above are encountered when tipping the trailer is required.

OUTLINE OF THE INVENTION

The present invention aims to provide an improved tipping trailer which is stable in use during tipping. The present invention in a further preferred aspect aims to provide a tipping trailer that is typically longer than more conventional tipping trailers and therefore offers greater volumetric capacity. The present invention in yet a further preferred aspect aims to provide control apparatus for use in maintaining the stability of trailers during tipping. Other objects and advantages of the invention will become apparent hereunder.

The invention therefore provides a tipping trailer having forward and rear ends and a longitudinal axis and including a trailer bed, longitudinally spaced wheel assemblies for supporting the rear end of said trailer bed and pivotally mounted arm means coupling the trailer bed to the longitudinally spaced wheel assemblies characterised in that the arm means has a rearward pivotal connection and a forward pivotal connection such that as the trailer is tipped and said longitudinally spaced wheel assemblies remain in ground contact during tipping of said trailer bed with the load distributed evenly across the said longitudinally spaced wheel assemblies. "Trailer bed" is herein defined to mean any trailer section and includes but is not limited to flat beds, open topped and closed containers by way of non-limiting example.

The present invention thus provides in a first preferred aspect a tipping trailer including a trailer bed, a pair of longitudinally spaced wheel assemblies for supporting the rear of said trailer bed and pivotally mounted arm position control means for transferring load whereby said load is taken by said pair of longitudinally spaced wheel assemblies and said longitudinally spaced wheel assemblies remain in contact with the ground during tipping of said trailer bed with the load distributed evenly across the longitudinally spaced wheel assemblies. The pivotally mounted arm position control means, preferably comprises expandable and retractable arm position control means controlled to result in even load distribution.

Suitably the pair of longitudinally spaced wheel assemblies are mounted on a wheel carriage separate from the trailer bed or chassis and arm means connect the wheel carriage to the trailer bed. The arm means suitably is pivotally connected at one end to the wheel carriage intermediate the longitudinally spaced wheel assemblies of the pair and at their opposite end to the trailer bed. The arm means suitably extends rearwardly from its pivotal connection to the carriage for pivotal connection to the rear of the trailer bed. The arm means may be in the form of a main beam extending across the trailer bed above the longitudinally spaced wheel assemblies. Alternatively, the arm means may comprise arms on opposite sides of the trailer bed. The arms in this form may be interconnected.

The means for transferring load to the pair of rear longitudinally spaced wheel assemblies suitably includes ram means between the arm means and trailer bed. As the trailer bed is tipped, the ram means suitably are extended to maintain load through the arm means on both the rear longitudinally spaced wheel assemblies. Similarly when the trailer bed is lowered, the ram means are retracted. During these actions, the ram means also maintain the arm means in substantially the same position in space. The ram means preferably comprise one or more hydraulic rams. Suitably respective hydraulic rams may be provided on opposite sides of the trailer bed to extend between the arm means and the trailer bed.

The leading wheel assembly suitably remains in contact with the ground when the trailer bed is in its lowered position such that the load of, and/or carried, by the trailer bed is taken by the three or more longitudinally spaced wheel assemblies. When the trailer bed is tipped, the further wheel assembly is suitably lifted with the trailer bed from the ground.

Suitable suspension means are provided for the respective wheel assemblies. Preferably the suspension means comprise air suspension means. The air suspension means preferably comprise air springs suitably air bag means. The pair of rear longitudinally spaced wheel assemblies have respective axles which may be supported on respective suspension arms pivotally mounted to the wheel carriage. The air bag means are preferably provided between the free ends of the suspension arms and carriage. The further wheel assembly has an axle which may be supported on suspension arms pivotally mounted to the trailer bed. The air bag means for the further wheel assembly are preferably provided between the free ends of the suspension arms and trailer bed.

Most preferably, the air springs or air bag means of the air suspension means of the respective wheel assemblies are fluidly interconnected to equalise pressure to ensure even distribution of load across three or more axles of the longitudinally spaced wheel assemblies when the trailer is its lowered load carrying position.

For tipping of the trailer, the air bag means may remain inflated or alternatively, the air bag means may be deflated. Deflation of the air bag means provides a more stable tipping platform.

The present invention in a further aspect provides control apparatus for controlling the application of fluid to, or exhaustion of fluid from the ram means to resulting in the trailing longitudinally spaced wheel assemblies remaining in contact with the ground during tipping or lowering of the trailer bed. The control apparatus suitably includes first means for sensing directly or indirectly the position of the arm means relative to the trailer bed and means for applying fluid to, or releasing fluid from, the ram means if the sensed position does not correspond to a predetermined position.

The control apparatus suitably also includes further sensing means for sensing directly or indirectly the angular position of the trailer bed. The further sensing means suitably comprises means for sensing the angular position of linkage means connecting the trailer to a prime mover, relative to the trailer bed.

The control apparatus preferably compares the outputs of, or signals derived from, the first and further sensing means and if this comparison is not within predetermined limits, the control apparatus provides a control signal to cause hydraulic fluid to be supplied to, or exhausted from, the hydraulic ram means until the comparison is within predetermined limits. Supply of fluid to, or exhausting fluid from the ram means will extend or allow retraction of the ram means. The rate of supply or exhaustion of fluid is controlled in accordance with the compared angle signals to maintain the predetermined position of the arm means.

The first and further sensing means suitably comprise rotary or linear potentiometers however other forms of sensing means may be employed.

BRIEF DESCRIPTION OF THE DRAWINGS

In order that the invention may be more readily understood and put into practical effect reference will now be made to the accompanying drawings which illustrate a preferred embodiment of the invention and wherein:

FIGS. 2 and 3 illustrate the rear of the trailer bed in a raised and lowered attitude respectively.

PREFERRED EMBODIMENT

Figure 1:
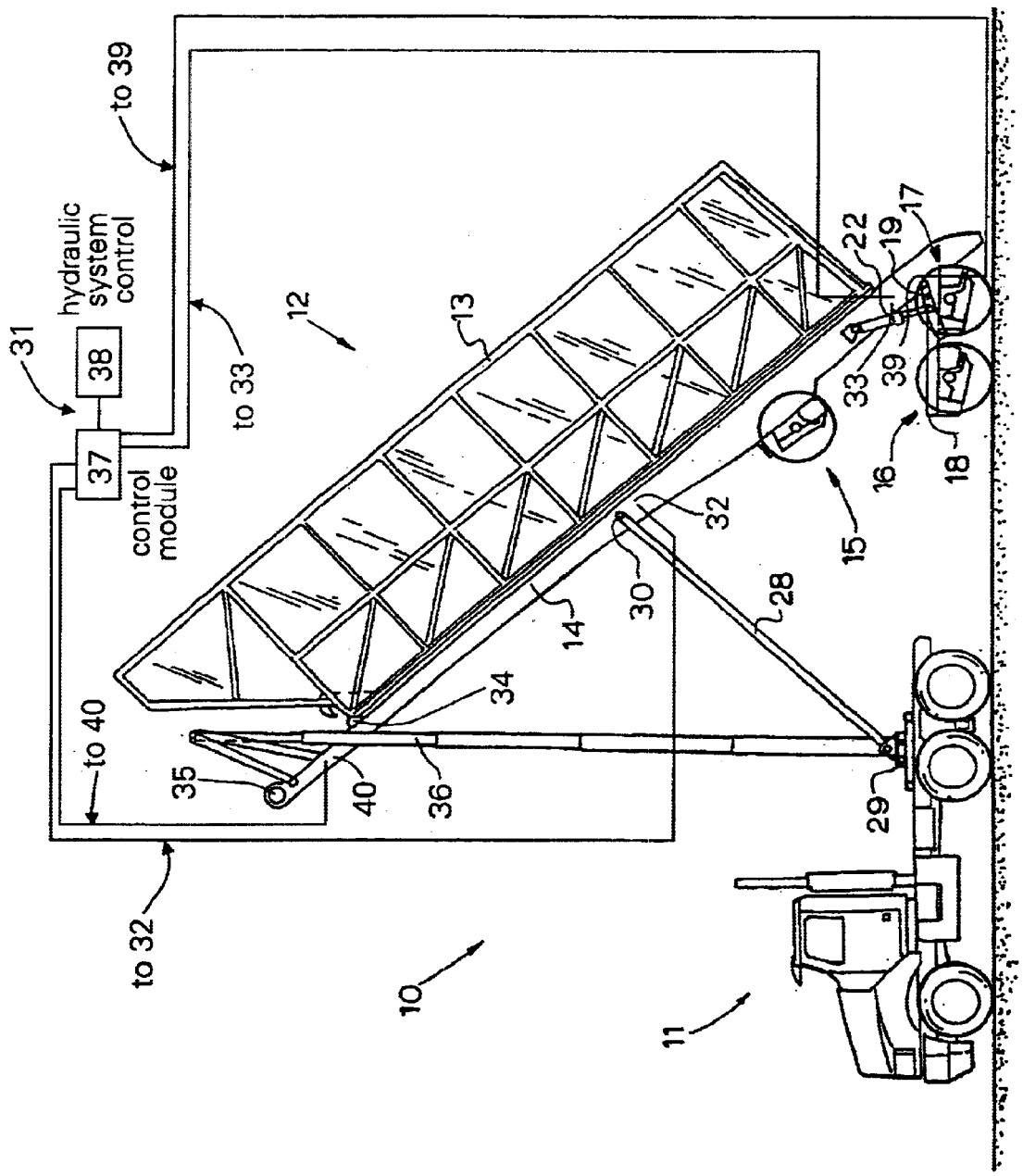
FIG. 1 illustrate a vehicle including a trailer according to a preferred embodiment of the invention with the trailer in a raised tipping attitude.

Referring to the drawings and firstly to FIG. 1, there is illustrated a vehicle 10 including a prime mover 11 and tipping trailer assembly 12 adapted to be towed by the prime mover 11. The tipping trailer assembly 12 in this embodiment is arranged to carry a load in the form of a container 13; however, it may of course be adapted for carrying any suitable load. The trailer assembly 12 includes a trailer bed 14 having at its rear end three or more sets of longitudinally spaced wheel assemblies, (three being illustrated in this embodiment) comprising a first leading wheel assembly 15 mounted at a fixed position to the trailer bed 14 and a trailing pair of longitudinally spaced wheel assemblies 16 and 17.

Figure 2:
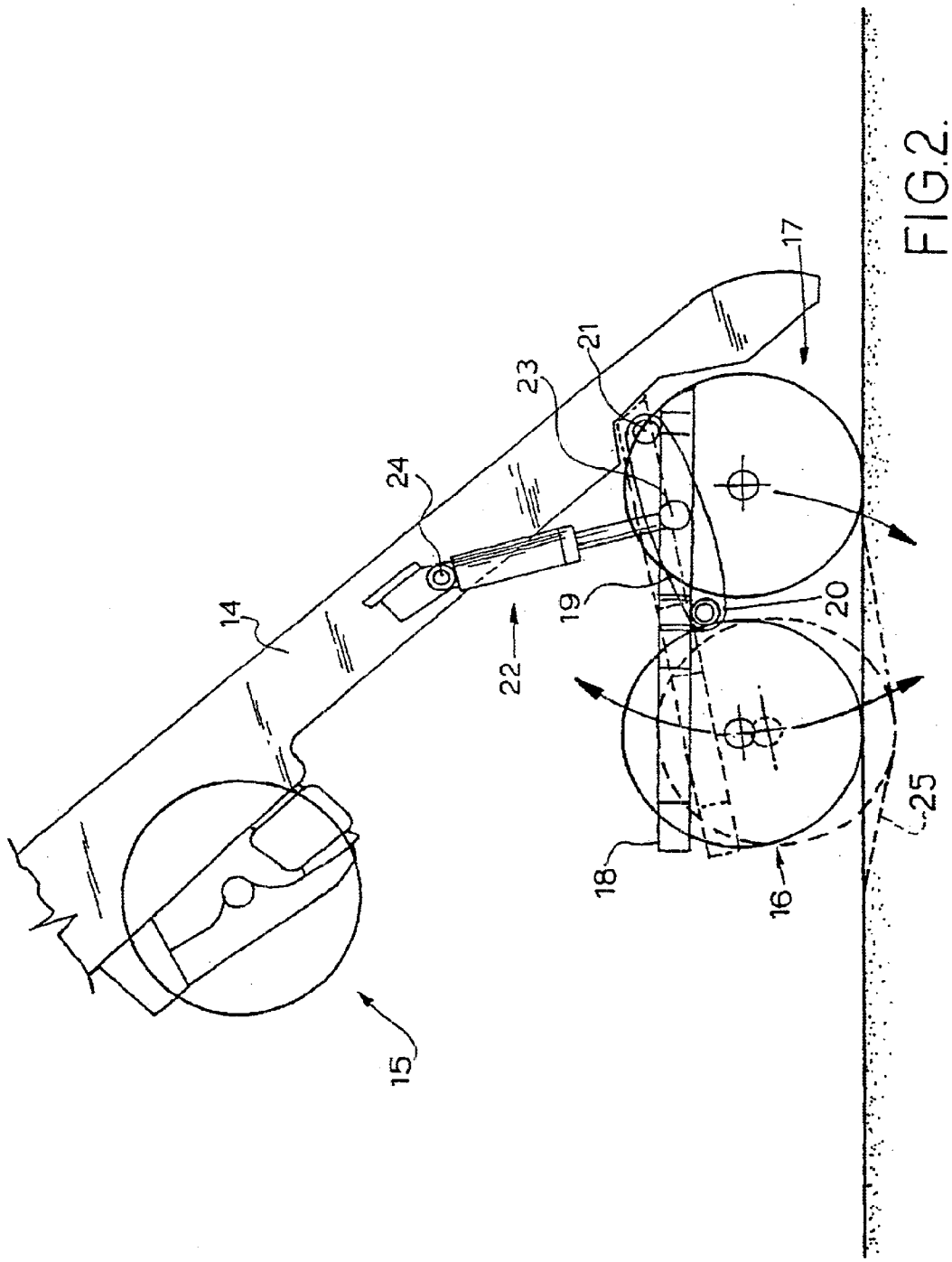

The wheel assemblies 16 and 17 as more clearly shown in FIGS. 2 and 3 are mounted at spaced apart positions to a carriage 18 and arm 19. Arm 19 connects the carriage 18 to the trailer bed 14, the arm 19 for this purpose being pivotally connected on opposite sides. At one end, the arm 19 is connected to the carriage 18 at 20 intermediate the wheel assemblies 16 and 17 and at its opposite end the arm 19 is connected to the trailer bed 14 at 21. The arm 19 can be separate units or can be formed from a main beam having the pivot connections at opposite ends of the beam. As is apparent, the arm 19 extends rearwardly from its pivot connection 20 to the pivot connection 21. A hydraulic ram 22 extends between the arm 19 and trailer bed 14, the ram 22 being pivotally connected at 23 to the arm 19 intermediate the ends thereof and at its opposite end being pivotally connected to the trailer bed 14 at 24. A pair of rams 22 may be provided on opposite sides of the trailer bed 14 for connection between the bed 14 and arm 19. The rams 22 serve to hold the arm 19 in a predetermined orientation independent of the trailer bed position or the position of the wheel assemblies. Thus if the rams 22 are held in a retracted position the trailer bed will revert to an over rear axle tipper and only the rearmost wheel assembly will remain in ground contact. Over rear axle tipping may be desirable where the resultant different position of the trailer bed may facilitate loading in those circumstances where a shallower inclination is desirable but at a lower rear position. Alternatively, controlled extension of the rams 22 to retain the arm 19 in the position illustrated in FIGS. 1 and 2 will result in the trailer tipping about the pivot 20 to a greater inclination for discharge of a higher volumetric load than allowable or achievable in the prior art and under a more stable condition.

As shown by the arrows and dotted lines in FIG. 2, the carriage 18 is free for limited oscillating movement about its pivot connection 20 to the arm 19 to accommodate undulations in the road or other surface 25 with which the wheels of the wheel assemblies 16 and 17 are in contact. This carriage arrangement has implications during tipping due to the independent control over the position of the arm 19 in space, the wheels are free to adopt a position dictated by the terrain and this will not influence the stability of the tipping action. It will be appreciated that the carriage may have more than two longitudinally spaced wheel assemblies and an associated central pivot equivalent to pivot 20 to provide even load distribution.

The axles of the respective wheel assemblies 15, and 16 and 17 are supported to the trailer bed 14, and carriage 18 respectively via suspension arms 26 pivotally mounted to the trailer bed 14, and carriage 18 and an air bag suspension system comprising air bags 27 are provided between the free ends of the suspension arms 26 and trailer bed 14, and carriage 18. The air bags of the air suspensions systems of the respective wheel assemblies 15, 16 and 17 are fluidly connected such that when the trailer bed 14 is in a lowered "in-transit" attitude, the pressure in the air bags is equalised whereby load is substantially equally spread over the axles of the three or more wheel assemblies 15, 16 and 17.

The trailer assembly 12 in this embodiment is connected to the prime mover 11 by means of a spider linkage 28 which extends between, and is pivotally connected to the prime mover turntable 29 and the trailer bed 14 at a position 30 intermediate it ends. For tipping purposes, means may be provided to elevate the leading end of the trailer assembly 12 for example a hydraulic hoist (depicted by the vertical line in FIG. 1) or alternatively lifting of the leading end of the trailer assembly 12 may be achieved by the spider linkage 28 (as described below) with or without an assisting winch mechanism. Alternatively, combinations of the above lifting arrangements may be used.

During the upward tipping movement of the trailer bed 14, the front wheel assembly 15 lifts upwardly with the bed 14. To maintain the rear wheel assemblies 16 and 17 in contact with the ground, the rams 22 are progressively extended from the retracted position shown in FIG. 3 to the extended position of FIG. 2. This will maintain the arm 19 in substantially the same position in space and transfer the load of and/or carried by the trailer bed 14 via the pivot point 20 to the carriage 18. This will ensure that both rear wheel assemblies 16 and 17 maintain contact with the ground. Further as the load is taken by the pair of wheel assemblies 16 and 17, the trailer assembly 12 will be more stable as it is tipped with load shared between the pair of wheel assemblies.

As the trailer bed 14 is lowered, fluid is progressively released from the rams 22 such that both wheel assemblies 16 and 17 continue to remain in contact with the ground.

In an alternative arrangement for tipping the trailer bed 14, a winch line may be provided between the prime mover and trailer bed 14 such that when the line is wound in by a winch on the prime mover 11, the rear of the trailer bed 14 is brought towards the prime mover 11 which will effect tipping of the trailer bed 14 as in FIGS. 1 and 2.

Again referring to FIG. 1 there is illustrated schematically control apparatus 31 for controlling fluid supply to or from the rams 22 automatically as the trailer bed 14 is tipped or lowered to extend and retract, or allow retraction of, the rams 22. The apparatus 31 includes first angle sensing means 32 at the pivot connection 30 between the spider link 28 and the trailer bed 14 may be in the form of a rotary potentiometer which senses the angular relationship between the spider link 28 and trailer bed 14. A further angle sensing means 33 which again may be in the form of a rotary potentiometer is arranged on the trailer bed 14 to sense the angular relationship between the carriage arm 19 and the trailer bed 14. The trailer bed 14 may also carry as is conventional a container carriage 34 for coupling to containers 13 for moving the containers 13 along the bed 14. Hydraulic winches 35 at the forward end of the bed 14 may be operated to move the carriage 34 via chains and/or cables up and down the bed 14.

For lifting the front of the trailer bed 14, a hoist 36 as is coventional may be provided between the front of the bed 14 and turntable 20. The hoist 36 and winches 35 may be controlled by a joy stick on a control panel of a control module 37 in the cabin of the prime mover 11.

Forward and rear proximity switches 39 and 40 may be provided on the bed 14 to sense the forwardmost and rearmost positions of the container carriage 34 to stop the winches 35 with the carriage 34 in these positions to unload the hydraulic system.

In use, assuming that the hoist 36 is operated, as the trailer bed 14 is raised or lowered, the potentiometer 32 will be initially rotated and the output or reading of this potentiometer 32 is received by the control module 37 and compared with the output or reading of the potentiometer 33. The resulting error signal is compared with a set (but adjustable) error signal range and an output signal proportional to the error signal generated if the error signal is beyond the set range. The error signal will indicate whether the arm 19 is pivotally moving towards or away from the bed 14 at the same rate that the spider link 28 is pivotally moving towards or away from the bed 14. An error signal of zero will indicate that the arm 19 is remaining in the same spatial position during tipping or lowering of the bed 14. The output signal is applied to the hydraulic system control 38 which causes fluid to be supplied to, or exhausted from the hydraulic rams 22 in accordance with the magnitude of the output signal. Thus, if the error signal and thus output signal are large, the hydraulic system will be controlled to make a large adjustment to the fluid supply and/or pressure to the rams 22 and vice versa. For example if the hoist 36 is raised quickly, fluid will be rapidly supplied to the rams 22 to cause their extension quickly to maintain the arm 19 in a substantially constant spatial position and the wheel assemblies 16 and 17 carried by the carriage substantially in ground contact as wheel carriage 18 is free to pivot about 20 relative to arm 19. Similarly, if the trailer bed 14 is being rapidly lowered, the hydraulic control system 38 will operate to rapidly exhaust fluid from the rams 22 again to maintain the arm 19 in substantially the same position, with the resultant as above. This tipping trailer system allows a trailer of increased length and thereby increased volume carrying capacity to be constructed without compromising tipping or travelling stability. This is further enhanced by the use of three or more supporting wheel assemblies for the trailer bed. In addition, as the rear pair of wheel assemblies remain in ground contact as the trailer bed is tipped, the trailer will always remain in it's most stable condition as the arm 19, carriage 18, ram(s) 22, pivot 20 and other components provide substantially even distribution of load over all four wheels within the two rear wheel assemblies, or more as the case may be. The trailer of the invention whilst described in reference to container carrying may also be used as a tipping trailer for many different loads and trailer body configurations.

Whilst the above has been given by way of illustrative example of the present invention many variations and modifications thereto will be apparent to those skilled in the art without departing from the broad ambit and scope of the invention as defined in the appended claims.

What is claimed is:

1. A tipping trailer having forward and rear ends and a longitudinal axis and including a trailer bed, longitudinally spaced wheel assemblies for supporting a rear end of said trailer bed and pivotally mounted arm means coupling the trailer bed to the longitudinally spaced wheel assemblies characterised in that the arm means has a rearward pivotal connection and a forward pivotal connection such that as the trailer is tipped and said longitudinally spaced wheel assemblies remain in ground contact during tipping of said trailer bed with a load distributed evenly across the said longitudinally spaced wheel assemblies.

2. A tipping trailer according to claim 1 further including pivotally mounted arm position control means comprising extendable and retractable arm position control means operative to cause even load distribution across the longitudinally spaced wheel assemblies.

3. A tipping trailer according to claim 1 wherein the longitudinally spaced wheel assemblies are mounted on a wheel carriage separate from the trailer bed and the arm means connects the wheel carriage to the trailer bed.

4. A tipping trailer according to claim 1 wherein the longitudinally spaced wheel assemblies are mounted on a wheel carriage separate from the trailer bed and the arm means connects the wheel carriage to the trailer bed, the arm means being pivotally connected at its forward pivotal connection to the wheel carriage intermediate the longitudinally spaced wheel assemblies and to the trailer bed at the rearward pivotal connection.

5. A tipping trailer according to claim 1 wherein the longitudinally spaced wheel assemblies are mounted on a wheel carriage separate from the trailer bed and the arm means connects the wheel carriage to the trailer bed, the arm means being pivotally connected at its forward pivotal connection to the wheel carriage intermediate the longitudinally spaced wheel assemblies and to the trailer bed at the rearward pivotal connection, the arm means extending rearwardly from its pivotal connection to the carriage for pivotal connection to the rear of the trailer bed and comprising a main beam extending across the trailer bed above the longitudinally spaced wheel assemblies.

6. A tipping trailer according to claim 1 wherein the longitudinally spaced wheel assemblies are mounted on a wheel carriage separate from the trailer bed and the arm means connects the wheel carriage to the trailer bed, the arm means being pivotally connected at its forward pivotal connection to the wheel carriage intermediate the longitudinally spaced wheel assemblies and to the trailer bed at the rearward pivotal connection, the arm means extending rearwardly from its pivotal connection to the carriage for pivotal connection to the rear of the trailer bed and comprising respective arms on opposite sides of the trailer bed.

7. A tipping trailer according to claim 1 further including pivotally mounted arm position control means controlled to maintain a predetermined position of the arm means.

8. A tipping trailer according to claim 1 further including pivotally mounted arm position control means controlled to maintain a predetermined position of the arm means, wherein the arm position control means includes an hydraulic ram extending between the arm means and the trailer bed.

9. A tipping trailer according to claim 1 further including pivotally mounted arm position control means controlled to maintain a predetermined position of the arm means, wherein the arm position control means includes hydraulic rams extending between the arm means and the trailer bed on opposite sides of the trailer bed.

10. A tipping trailer according to claim 1 wherein there is provided a leading wheel assembly located in front of the said longitudinally spaced wheel assemblies, the leading wheel assembly being in ground contact when the trailer bed is in a lowered position such that loading is taken by the leading wheel assembly and the said longitudinally spaced wheel assemblies.

11. A tipping trailer according to claim 1 wherein the longitudinally spaced wheel assemblies are mounted on a wheel carriage separate from the trailer bed and the arm means connects the wheel carriage to the trailer bed, there is provided a leading wheel assembly located in front of the longitudinally spaced wheel assemblies, the leading wheel assembly being in ground contact when the trailer bed is in a lowered position such that loading is taken by the three wheel assemblies.

12. A tipping trailer according to claim 1 wherein suspension means are provided for the respective wheel assemblies, the suspension means comprising air suspension means.

13. A tipping trailer according to claim 1 wherein said longitudinally spaced wheel assemblies are mounted on a wheel carriage and have respective axles supported on respective suspension arms pivotally mounted to the wheel carriage, the suspension arms having free ends and there being air bag means provided between the free ends of the suspension arms and carriage.

14. A tipping trailer according to claim 1 wherein the said longitudinally spaced wheel assemblies are mounted on a wheel carriage and have respective axles supported on respective suspension arms pivotally mounted to the wheel carriage, the suspension arms having free ends and there being air bag means provided between the free ends of the suspension arms and carriage, there being provided a further wheel assembly in front of the said longitudinally spaced wheel assemblies, the further wheel assembly having an axle supported on suspension arms pivotally mounted to the trailer bed.

15. A tipping trailer according to claim 1 wherein the said longitudinally spaced wheel assemblies are mounted on a wheel carriage and have respective axles supported on respective suspension arms pivotally mounted to the wheel carriage, the suspension arms having free ends and there being air bag means provided between the free ends of the suspension arms and carriage, there being provided a further wheel assembly in front of the said longitudinally spaced wheel assemblies, the further wheel assembly having an axle supported on suspension arms pivotally mounted to the trailer bed, the further wheel assembly suspension arms having free ends and there being air bag means between the free ends of the further wheel assembly suspension arms supporting the further wheel assembly and the trailer bed.

16. A tipping trailer according to claim 1 wherein suspension means are provided for the respective wheel assemblies, the suspension means comprising air suspension means, the air suspension means of the respective wheel assemblies being fluidly interconnected to equalise pressure to ensure even distribution of load across the wheel assemblies when the trailer is lowered to a lowered load carrying position.

17. A tipping trailer according to claim 1 wherein suspension means are provided for the respective wheel assemblies, the suspension means comprising air suspension means, the air suspension means comprising air bags able to be deflated to provide a more stable tipping platform.

18. A tipping trailer according to claim 1 further comprising pivotally mounted ram means controlled for even load distribution across the longitudinally spaced wheel assemblies, control apparatus for controlling the application of fluid to, or exhaustion of fluid from the ram means to maintain the longitudinally spaced wheel assemblies in contact with the ground during tipping or lowering of the trailer bed, the control apparatus including first means for sensing directly or indirectly the position of the arm means relative to the trailer bed and means for applying fluid to, or releasing fluid from, the ram means if the sensed position does not correspond to a predetermined position.

19. A tipping trailer according to claim 1 further comprising pivotally mounted ram means controlled to maintain even load distribution to the longitudinally spaced wheel assemblies, control apparatus for controlling the application of fluid to, or exhaustion of fluid from the ram means to maintain the longitudinally spaced wheel assemblies in contact with the ground during tipping or lowering of the trailer bed, the control apparatus including first means for sensing directly or indirectly the position of the arm means relative to the trailer bed and means for applying fluid to, or releasing fluid from, the ram means if the sensed position does not correspond to a predetermined position, and further sensing means for sensing directly or indirectly the angular position of the trailer bed.

20. A tipping trailer according to claim 1 further comprising pivotally mounted ram means controlled to maintain even load distribution to the longitudinally spaced wheel assemblies, control apparatus for controlling the application of fluid to, or exhaustion of fluid from the ram means to maintain the longitudinally spaced wheel assemblies in contact with the ground during tipping or lowering of the trailer bed, the control apparatus including first means for sensing directly or indirectly the position of the arm means relative to the trailer bed and means for applying fluid to, or releasing fluid from, the ram means if the sensed position does not correspond to a predetermined position, and further sensing means for sensing the angular position of linkage means connecting the trailer to a prime mover, relative to the trailer bed, the control apparatus comparing outputs of, or signals derived from, the first and further sensing means and if this comparison is not within predetermined limits, the control apparatus provides a control signal to cause hydraulic fluid to be supplied to, or exhausted from, the ram means until the comparison is within predetermined limits.

21. A tipping trailer according to claim 1 further comprising pivotally mounted ram means controlled to maintain even load distribution to the longitudinally spaced wheel assemblies, control apparatus for controlling the application of fluid to, or exhaustion of fluid from the ram means to maintain the longitudinally spaced wheel assemblies in contact with the ground during tipping or lowering of the trailer bed, the control apparatus including first means for sensing directly or indirectly the position of the arm means relative to the trailer bed and means for applying fluid to, or releasing fluid from, the ram means if the sensed position does not correspond to a predetermined position, and further sensing means for sensing the angular position of linkage means connecting the trailer to a prime mover, relative to the trailer bed, the control apparatus compares outputs of, or signals derived from, the first and further sensing means and if this comparison is not within predetermined limits, the control apparatus provides a control signal to cause hydraulic fluid to be supplied to, or exhausted from, the ram means until the comparison is within predetermined limits, the hydraulic fluid being supplied or exhausted at a rate, the rate of supply or exhaustion of fluid being controlled in accordance with the compared signals to maintain a predetermined position of the arm means and the longitudinally spaced wheel assemblies carried by the carriage substantially in ground contact.

22. A tipping trailer according to claim 1 wherein the arm means comprises a beam pivotally coupled to the longitudinally spaced wheel assemblies between the said longitudinally spaced wheel assemblies, and control means urging the beam to a predetermined orientation maintaining even distribution of load between the longitudinally spaced wheel assembies.

23. A tipping trailer according to claim 1 wherein the arm means comprises a beam pivotally coupled to the longitudinally spaced wheel assemblies between the said longitudinally spaced wheel assemblies, and control means urging the beam to a predetermined orientation maintaining even distribution of load between the longitudinally spaced wheel assemblies, the control means comprising a sensor controlled ram disposed between the arm means and the trailer bed.

24. A tipping trailer according to claim 1 wherein the longitudinally spaced wheel assemblies comprise more than two longitudinally spaced wheel assemblies.

25. A tipping trailer according to claim 1 wherein the longitudinally spaced wheel assemblies are mounted on a wheel carriage separate from the trailer bed, the arm means connects the wheel carriage to the trailer bed and the longitudinally spaced wheel assemblies comprise more than two longitudinally spaced wheel assemblies.

26. A tipping trailer according to claim 1 wherein the longitudinally spaced wheel assemblies comprise two longitudinally spaced wheel assemblies.

27. A tipping trailer according to claim 1 wherein the longitudinally spaced wheel assemblies are mounted on a wheel carriage separate from the trailer bed, the arm means connects the wheel carriage to the trailer bed and the longitudinally spaced wheel assemblies comprise two longitudinally spaced wheel assemblies.

* * * * *